United States Patent [19]
Nicolls

[11] Patent Number: 6,117,225
[45] Date of Patent: Sep. 12, 2000

[54] METHOD OF PREPARATION OF INKS

[75] Inventor: Stephen Lansell Nicolls, Adelaide, Australia

[73] Assignee: Tonejet Corporation Pty Ltd., South Australia, Australia

[21] Appl. No.: 09/102,049

[22] Filed: Jun. 22, 1998

[51] Int. Cl.⁷ .................................................. C09D 11/02
[52] U.S. Cl. ..................... 106/31.65; 106/31.61; 106/31.62; 106/31.63; 106/31.66; 106/31.86; 106/31.88; 106/31.9; 106/460; 106/476; 106/477; 106/500; 106/502; 106/504
[58] Field of Search .......................... 106/31.65, 31.61, 106/31.62, 31.63, 31.66, 31.86, 31.88, 31.9, 460, 476, 477, 500, 502, 504

[56] References Cited

U.S. PATENT DOCUMENTS

| | | | |
|---|---|---|---|
| 5,300,146 | 4/1994 | Jonas et al. | 106/460 |
| 5,336,309 | 8/1994 | Noguchi et al. | 106/31.65 |
| 5,344,487 | 9/1994 | Whalen-Shaw | 106/31.65 |
| 5,762,694 | 6/1998 | Yokoi et al. | 106/31.65 |
| 5,795,376 | 8/1998 | Ide | 106/31.65 |
| 5,800,601 | 9/1998 | Zou et al. | 106/31.65 |

FOREIGN PATENT DOCUMENTS

| | | |
|---|---|---|
| 04239065 | 8/1992 | Japan . |
| 05025417 | 2/1993 | Japan . |
| WO93/10190 | 5/1993 | WIPO ................................ 106/31.65 |

*Primary Examiner*—Helene Klemanski
*Attorney, Agent, or Firm*—Evenson, McKeown, Edwards & Lenahan, PLLC

[57] ABSTRACT

A process of producing a non-conductive ink formed from colorant particles and a non-conductive carrier liquid where the colorant particles are inherently of a low electrical resistivity. The process includes the steps of applying to the surface of the colorant particles a material with a high electrical resistivity to give the particle a higher surface resistivity and blending the treated colorant particle with the non-conductive carrier to form the non-conductive ink. The insulative material may be selected from polymers, waxes, organic pigments and dye stuffs and the colorant may be carbon black, magnetic iron oxide or metallic powder.

36 Claims, No Drawings

METHOD OF PREPARATION OF INKS

TECHNICAL FIELD

This invention relates to inks and more particularly inks suitable for ink jet printing apparatus and to a method of producing pigments for such inks.

BACKGROUND ART

A new ink jet printing technology has been described in WO-A-9311866 in the name of Research Laboratories of Australia Pty Limited which was published on the 24th Jun. 1993. This process provides a means of producing variable sized droplets that contain a high concentration of particulate material. Specific advantages conveyed by this process include the ability to form droplets as small as a few micrometres while still using pigments as the colorant material. This is because the size of the droplets are controlled primarily by the voltage on an injection point plus the ability of the particles to be charged and so are not limited by the size of an ink jet nozzle. Also the colorant material is significantly concentrated in the ejected droplets. Therefore, high resolution in high density images based on light and water resistant particles can be produced.

It is known that for good performance ink used in the abovementioned ink jet devices should have a volume resistivity in excess of $10^9$ ohm.cm to allow particle ejection driven droplet formation. In addition, the conductivity of the ejecting particle must be sufficiently low so as to maintain high ink resistivity. Inks which contain a high level of conductive particles tend to be difficult to print with and show poor print stability. It is thought that this is largely because high local concentrations of these conductive particles are able to form spatially extended conductors within the system and whenever these form in the wrong places they can impair the system.

There are several commercially important marking particles that exhibit high electrical conductivity and are therefor not well suited for optimum performance in the ink jet process described in patent publication WO-AWO 9311866. The most important of these include carbon black, magnetic iron oxide and metallic powders but the invention is not restricted to these particles and their use as pigments in inks.

Carbon black (Cl Pigment Black 7) is the most widely used black pigment in conventional printing technologies. Carbon black pigments are prepared by the incomplete combustion of organic (carbon containing) fuels. The pigment usually consists of elemental carbon in combination with residual volatile material of up to 20%, the exact composition being dependent on the fuel stock used and the method and conditions of manufacture. The surface characteristics of carbon black including the conductivity or resistivity of the particles appear to be largely dependent on the amount and type of volatile material present.

Some of the desirable properties of carbon black are that it has excellent opacity, It has a neutral black colour, it has excellent resistance to acid alkali soap and solvent, it is extremely light fast and it is relatively inexpensive.

These features make carbon black very desirable as a marking particle for many printing technologies, however, carbon black has an inherent high conductivity and the performance of carbon black inks in the abovementioned printing technology is therefore less than optimum.

Magnetic iron oxide occurs naturally as mineral magnetite. Alternatively it can be synthesised by a variety of processes such as the precipitation of hydrated ferric oxide from a solution of iron salts followed by dehydration and then reduction with hydrogen. This black pigment material is characterised by a strong permanent magnetism. Commercial uses of magnetic iron oxide include the manufacture of magnetic inks for the printing of MICR information (magnetic ink character recognition).

These magnetic iron oxide particles have a high conductivity and again while they are useful as marking particles their performance in the abovementioned ink jet printing technology is not optimum.

Metallic powders consist of metals or alloys of metals. Examples are Cl Pigment Metal 2 which is an alloy of copper and zinc and Cl Pigment Metal 1 which is a powdered aluminium. Applications for the printing of metallic powders include decorative marking and the printing of electrically conductive circuits. It will be realised of course that metallic powders are inherently conductive and as such do not provide optimum printing using the abovementioned ink jet printing technology.

As mentioned above the present invention is not limited to these particular particles.

It is an object of this invention to provide a method of reducing the conductivity of such pigment particles and to making inks using such reduced conductivity or increased resistivity particles.

DISCLOSURE OF THE INVENTION

It has been found that conductive particles such as carbon black, metallic iron oxide and metallic powders and others can be modified to reduce their conductivity. This is achieved by mixing the conductive pigment with a non-conductive or insulative material. A composite marking particle is thereby produced which has low electrical conductivity but which exhibits the good printing qualities of the chosen pigment.

In one form therefore although this may not necessarily be the only or broadest form the invention is said to reside in a process of producing a particle having a high resistivity or low conductivity for use in an ink, the particle having a low resistivity or high conductivity, the process including the step of applying to the surface of the particle a material which is insulative.

In a further form the invention may be said to reside in a process of producing a non-conductive ink, the ink including a colorant particle and a non-conductive liquid carrier, wherein the colorant particle is of a low electrical resistivity, the process including the steps of applying to the surface of the particles a material with a high electrical resistivity to thereby give the particle a higher surface resistivity and blending the treated colorant particle with the non-conductive carrier to thereby form a non-conductive ink.

Examples of insulative materials suitable for applying to the surface of conductive pigments include polymers, waxes, organic pigments and dye stuffs.

Examples of polymers that can be used for applying to the surface of the conductive pigments include epoxy resins such as bisphenol A epoxy, novolac epoxy and cycloaliphatic epoxy; acrylic resins such as polymers and copolymers of acrylic acid and esters thereof, polymers and copolymers of methacrylic acid and esters thereof; vinyl resins such as polymers and copolymers including vinyl acetate, vinyl chloride, vinyl alcohol and vinyl butyral; alkyd resins such as oil, phenolic and rosin modified alkyds and finally modified rosin esters such as dimerised pentaerythrtol rosin ester.

Examples of waxes that can be used for applying to the surface of the conductive pigments include Natural waxes such as shellac wax, beeswax, carnauba wax and hydrogenated castor oil; Petroleum waxes such paraffin wax and microcrystalline wax; Mineral wax such as montan wax; Synthetic waxes including polyethylene wax, chlorinated hydrocarbon wax and amide wax.

Examples of dyestuffs that can be used for applying to the surface of the conductive pigments include basic dyes such as Cl basic Blue 26; spirit soluble dyes such as Cl Solvent Black 29, Cl Solvent Blue 49 and Cl Solvent Red 7.

Examples of organic pigments that can be used for applying to the surface of the conductive pigments include Cl Pigment Yellow 1, Cl Pigment Yellow 14, Cl Pigment Red 48:2, Cl Pigment Red 122, Cl Pigment Blue 15:3 and Cl Pigment Blue 18.

As an example of the range of electrical resistivity which affects the efficacy of printing it has been found that a change in resistivity from 100 ohm.cm to 125 ohm.cm provides considerable improvement. The actual improvement in performance of a particular particle may depend upon the original resistivity, the type of surface treatment or coating and the desired final properties of the ink.

Once the conductivity or resistivity modified particles have been produced the ink jet ink according to this invention may be prepared by dispersing the modified colorant particles and other components as required into a non-conductive liquid. A variety of processes can be employed for the perforation of the ink including ball mills, attritors, colloid mills, three roll mills, pearl mills and high speed dispersers.

The non-conductive liquid may be any suitable liquid with the characteristics as discussed above and may include aliphatic hydrocarbons such as hexane, cyclohexane, isodecane, Isopar (manufactured by Exxon) and Shellsol T (manufactured by Shell); aromatic hydrocarbons such as xylene, toluene and Solvesso 100 (manufactured by Exxon); chlorinated solvents such as diethylene chloride and chloroform; silicone fluids or oils such as dimethyl polysiloxane, for instance DC 200 (manufactured by Dow Coming) and cyclic dimethyl polysiloxane, for instance DC 345 (manufactured by Dow Coming) and vegetable oils such as olive oil, safflower oil, sunflower oil, soya oil or linseed oils.

Other components which may be added into the ink include a particle charging agents, binder, viscosity stabilizers, preservatives and the like.

The actual process of applying the insulative material to the surface of the particle will depend upon the type of insulative material being applied.

In the case of a non-conductive dye the dye may be dissolved in a solvent in which the particle to be surface treated is not soluble and the mixture of the dissolved dye and pigment particle can be blended such as by roll milling or the like until the dye is adsorbed onto the surface of the pigment particle. The solvent can then be driven off the particles to provide a surface modified particulate agent which can be used to then manufacture an ink.

Where the insulative material is a wax then the colorant particle can be blended with the melted wax to disperse the particles in the wax and then the dispersion allowed to cool and resolidify and then the solid material may be ground up to provide a fine particulate material which then can be used to make the inks according to this invention. A translucent wax will not affect the perceived colour of the resultant particle.

In the case of organic pigments the two materials may be ground together to produce composite particles with the desired highly insulative properties.

In the case of polymers these materials may be blended with the particles in solution or in a melted form, the surface of the particles becoming at least partially coated after drying and cooling. Also, the monomers of polymers can be blended with the particles and the polymerised thereby coating the particles with the polymer.

In each of these cases the degree of coating may be such as to not effect the desirable properties such as colour but to affect the bulk conductivity of the particles and the overall volume resistlvity of the formulated ink.

It will be seen that by this invention there is produced a particle with electrical surface properties modified to the extent that they can be used as colorants in non-conductive inks for use with the aforesaid printing technology.

This generally describes the invention but to assist with understanding reference will now be made to examples which show modification of the properties of carbon black and production of inks using such modified pigments it will be realised of course that similar processes can be used for other conductive particles such as magnetic iron oxide particles and metallic powders.

BEST MODE FOR CARRYING OUT THE INVENTION

EXAMPLES

The carbon black particles were treated as set out in the Pigment modifications set out below.

Pigment Modification 1

| | |
|---|---|
| Tintacarb 300 | 15 g |
| Reflex Blue 3G | 3 g |
| Denatured methylated spirits | 150 g |

Place ingredients in 500 ml ball jar
Roll on mill for 3 hours
Pour into open tray and allow slurry to air dry Pigment Modification 2

| | |
|---|---|
| Tintacarb 300 | 50 g |
| Polyethylene AC6 | 50 g |

Heat polyethylene wax to melt (100° C.)
Add Tintacarb and mix with disperser for 15 minutes
Allow to cool and re-solidify Pigment Modification 3

| | |
|---|---|
| Example 1 (dyed pigment) | 45 g |
| Irgalite blue LGLD | 15 g |
| Polyethylene AC6 | 40 g |

Heat polyethylene wax to melt (100° C.)
Add pigment ingredients and mix with disperser for 15 minutes
Allow to cool and re-solidify The bulk resistivity of these particles was determined against that of a carbon black control and the results are set out in the table below:

| Sample | Modification | Bulk resistivity (ohm.cm) |
|---|---|---|
| Tintacarb 300 | carbon black control | 100 |
| Pigment modification 1 | CB + dye | 125 |
| Pigment modification 2 | CB + PE wax | 200 |
| Pigment modification 3 | CB + dye + phthalo. blue + PE wax | 200 |

The modified pigments prepared as set out above were formulated into inks as set out in the examples below.

| Ink Formulations | |
|---|---|
| Ink 1 (control) | |
| Tintacarb 300 | 25 g |
| Araldite GT 6084 | 25 g |
| FOA-2 | 5 g |
| DC 344 | 420 g |
| 6% Nuxtra Zirconium | 25 g |
| All ingredients ball milled for 72 hours | |
| Ink 2 | |
| Pigment Modification 1 | 25 g |
| Araldite GT 6084 | 25 g |
| FOA-2 | 5 g |
| DC 344 | 420 g |
| 6% Nuxtra Zirconium | 25 g |
| All ingredients ball milled for 72 hours | |
| Ink 3 | |
| Pigment modification 2 | 25 g |
| Araldite GT 6084 | 25 g |
| FOA-2 | 5 g |
| DC 344 | 420 g |
| 6% Nuxtra Zirconium | 25 g |
| All ingredients ball milled for 72 hours | |
| Ink 4 | |
| Pigment modification 3 | 25 g |
| Araldite GT 6084 | 25 g |
| FOA-2 | 5 g |
| DC 344 | 420 g |
| 6% Nuxtra Zirconium | 25 g |
| All ingredients ball milled for 72 hours | |

All ink examples were tested in an ink jet printing device as described in WOA-9311866 to image copy bond paper. Ink 1 exhibited non-uniform droplet ejection with poor dot size stability. Also, ink particles were found to plate out and coat the ejection tip causing ejection to cease after several minutes.

Inks (2), (3) and (4) all showed similar improved performance; there was no evidence of plating of the ejection tip and the election was uniform and controllable.

Tintacarb 300 is a carbon black Cl Pigment Black 7 made by Cabot Corporation

Reflex Blue 3G is a Cl Pigment Blue 18 made by Hoechst AG

Irgalite Blue LGLD is a pigment blue 15:3 made by Ciba Geigy

AC-6 is a polyethylene wax made by Allied Signal

Araldite GT 6084 is an epoxy resin made by Ciba Geigy

FOA-2 is a petroleum additive made by DuPont

6% Nuxtra Zirconium is a solution of zirconium octanoate in white spirits made by Huls America Inc.

DC344 is a silicone fluid made by Dow Corning

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

I claim:

1. A process for making a particle having a high resistivity or low conductivity for use in an ink, comprising:
   applying to the surface of a particle having a llcw resistivity or high conductivity a material which is insulative.

2. A process for making a non-conductive ink, comprising:
   applying a material with a high electrical resistivity to the surface of colorant particles having a low electrical resistivity to thereby give the particle a higher surface resistivity; and
   blending the treated colorant particle with a non-conductive carrier to thereby form the non-conductive ink.

3. The process of claim 2 wherein the material applied to the surface of the particle is selected from the group consisting of polymers, waxes, organic pigments and dye stuffs.

4. The process of claim 3, wherein the polymer is selected from the group consisting of epoxy resins, acrylic resins, vinyl resins, alkyd resins and modified rosin esters.

5. The process of claim 4, wherein the epoxy resins are selected from the group consisting of bisphenol A epoxy, novolac epoxy and cycloaliphatic epoxy.

6. The process of claim 4, wherein the acrylic resins are selected from the group consisting of polymers and copolymers of acrylic acid and esters thereof and polymers and colpolymers of methacrylic acid and esters thereof.

7. The process of claim 4, wherein the vinyl resins are selected from the group consisting of polymers and copolymers of vinyl acetate, vinyl chloride, vinyl alcohol and vinyl butyral.

8. The process of claim 4, wherein the alkyd resins are selected from the group consisting of oil, phenolic and rosin modified alkyds.

9. The process of claim 4, wherein the modified rosin esters are dimerized pentaerythritol rosin esters.

10. The process of claim 3, wherein the wax is selected from the group consisting of natural waxes, petroleum waxes, mineral waxes and synthetic waxes.

11. The process of claim 10 wherein the natural waxes are selected from the group consisting of shellac wax, beeswax, carnauba wax and hydrogenated castor oil.

12. The process of claims 10 wherein the petroleum waxes are selected from the group consisting of paraffin wax and microcrystalline wax.

13. The process of claim 10, wherein the mineral waxes are montan waxes.

14. The process of claim 10 wherein the synthetic waxes are selected from the group consisting of polyethylene wax, chlorinated hydrocarbon wax and amide wax.

15. The process of claim 3 wherein the dyestuff is selected from the group consisting of basic dyes and spirit dyes.

16. The process of claim 15, wherein the basic dyes are Cl basic Blue 26 dyes.

17. The process of claim 15 wherein the spirit dyes are selected from the group consisting of Cl Solvent Black 29, CI Solvent Blue 49 and Cl Solvent Red 7.

18. The process of claim 3, wherein the organic pigment is selected from the group consisting of CI Pigment Yellow 1, CI Pigment Yellow 14, CI Pigment Red 48:2, C: Pigment Red 122, CI Pigment Blue 15:3 and CI Pigment Blue 18.

19. The process of claim 3, wherein the electrical resistivity of the colorant particles is increased by at least 25 ohm.cm.

20. The process of claim 2, wherein the non-conductive carrier liquid is selected from the group consisting of alichatic hydrocarbons, aromatic hydrocarbons, chlorinated solvents, silicone fluids or oils and vegetable oils.

21. The process of claim 20, wherein the aliphatic hydrocarbons are selected from the group consisting of hexare, cyclohexane and iso-decane.

22. The process of claim 20, wherein the aromatic hydrocarbons are selected from the group consisting of xylene and toluene.

23. The process of claim 20, wherein the chlorinated solvents are selected from the group consisting of diethylene chloride and chloroform.

24. The process of claim 20, wherein the silicone fluids or oils are selected from the group consisting of dimethvl polysiloxane.

25. The process of claim 24 wherein the dimethyl polysiloxane is selected from the group consisting of cyclic dimethyl polysiloxane.

26. The process of claim 20, wherein the vegetable oils are selected from the group consisting of olive oil, safflower oil, sunflower oil, soya oil and linseed oil.

27. The process of claim 2, further comprising particle charging agents, binders, viscosity stabilizers and preservatives.

28. The process of claim 3 further comprising:

dissolving a non-conductive dye in a solvent in which the particle to be surface treated is not soluble, blending the dissolved dye and pigment particle by milling until the dye is adsorbed onto the surface of the pigment particle and driving off the solvent to provide a surface modified particle which can then be blended with the non-conductive carrier liquid.

29. The process of claim 28, wherein the dissolved dye and pigment particle are blended by roll milling.

30. The process of claim 3, further comprising:

melting a wax, blending the wax with the colorant particle to disperse the particles in the wax and then allowing the dispersion to cool and resolidify and then grinding the blended material to provide a surface modified particle which can then be blended with the non-conductive carrier liquid.

31. The process of claim 3, further comprising:

grinding an organic pigment with the colorant particle to provide a surface modified particle which can then be blended with the non-conductive carrier liquid.

32. The process of claim 3, further comprising:

dissolving a polymer in a solvent in which the particle to be surface treated is not soluble, blending the particles with the solution so formed, the surface of the particles becoming at least partially coated with the polymer and then driving off the solvent to provide a surface modified particle which can then be blended with the non-conductive carrier liquid.

33. The process of claim 3 further comprising:

melting a polymer, blending the melted polymer with then the colorant particle to disperse the particles in the polymer and then allowing the dispersion to cool and resolidifv and then grinding the blended material to provide a surface modified particle which can then be blended with the non-conductive carrier liquid.

34. The process of claim 3, further comprising:

dissolving a monomer of a polymer in a solvent in which the particle to be surface treated is not soluble, blending the particles with the solution so formed, the surface of the particles becoming at least partially coated with the monomer, driving off the solvent and polymerizing the monomer to a polymer to provide a surface modified particle which can then be blended with the non-conductive carrier liquid.

35. The process of claim 2, wherein the colorant particle is of a material selected from the group consisting of carbon black, magnetic iron oxide and metallic powder.

36. A non-conductive ink produced by the process of claim 2.

* * * * *